Feb. 11, 1969  G. R. DUNCAN, SR  3,426,517
GRAPE HARVESTER
Filed Dec. 3, 1965
FIG.1.
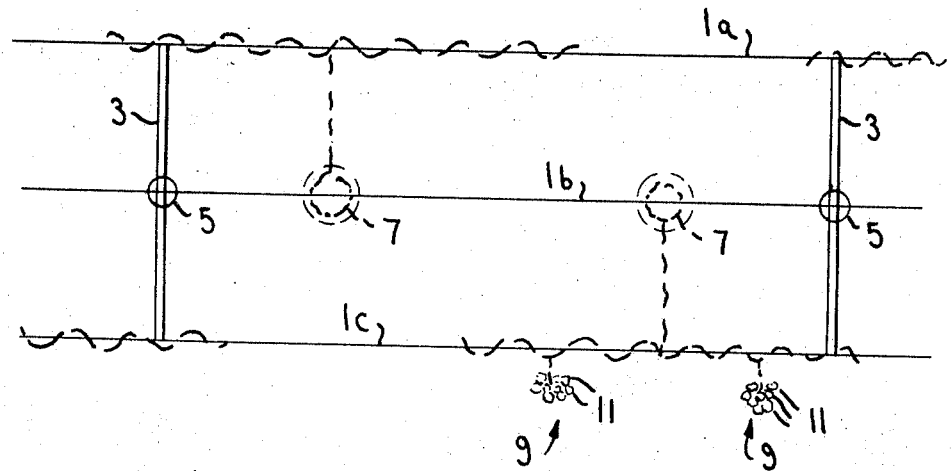
FIG.2.
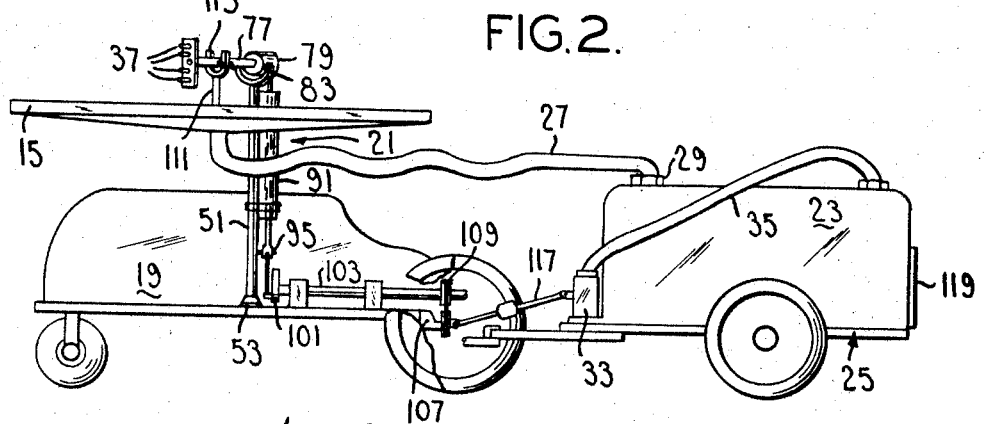
FIG.5.
George R. Duncan Jr.
Inventor
Koenig, Senniger, Powers and Leavitt,
Attorneys.

Feb. 11, 1969  G. R. DUNCAN, SR  3,426,517
GRAPE HARVESTER

Filed Dec. 3, 1965

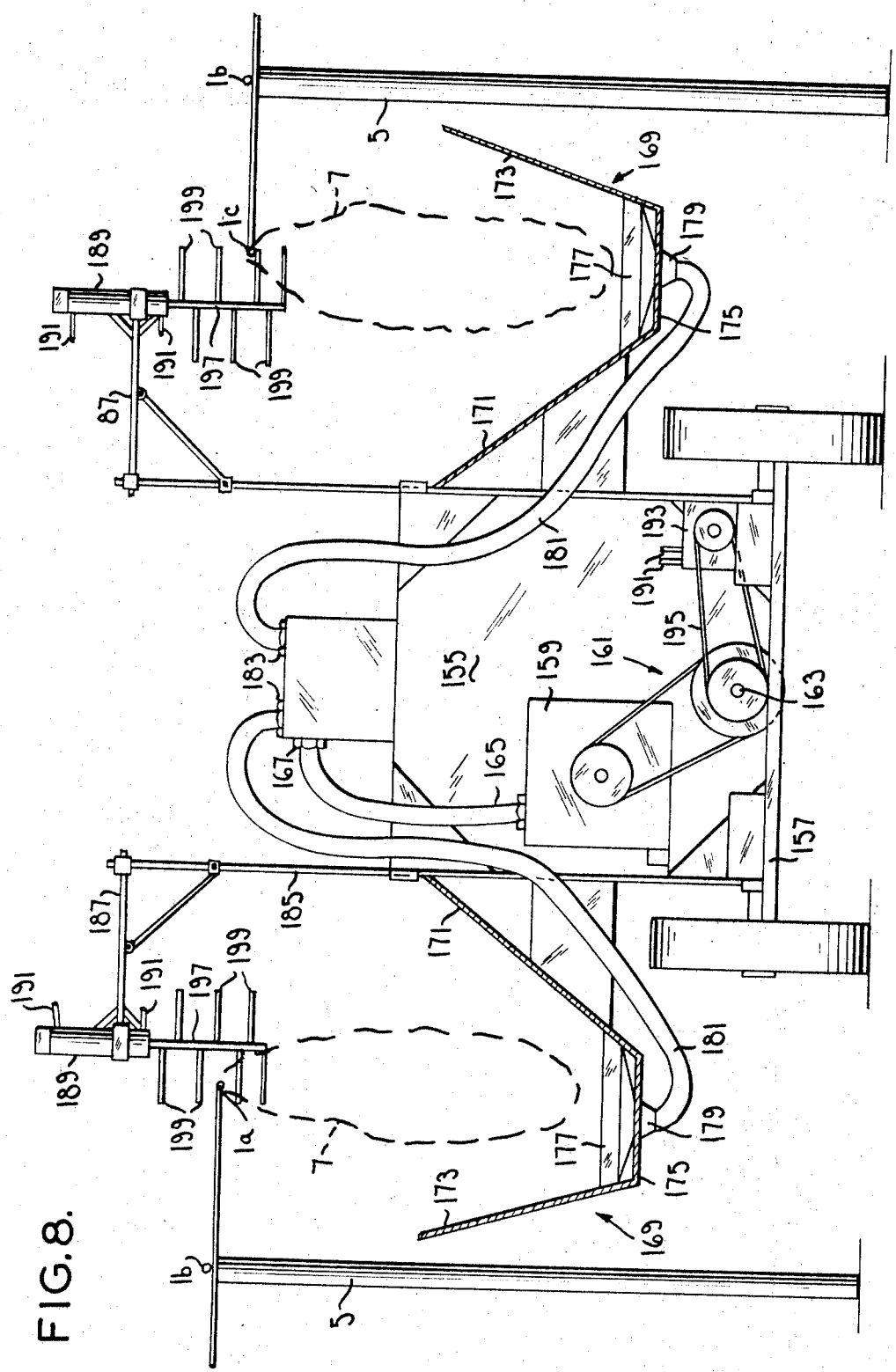

3,426,517
GRAPE HARVESTER
George R. Duncan, Sr., Scenic Drive,
Washington, Mo. 63090
Filed Dec. 3, 1965, Ser. No. 511,797
U.S. Cl. 56—330
Int. Cl. A01g 19/06
8 Claims

ABSTRACT OF THE DISCLOSURE

Apparatus is described which harvests grapes hanging in clusters from vines supported on generally horizontal wires. The apparatus includes an open topped pan having a downwardly tapered upper surface for collecting grapes falling from the grape clusters. Grapes falling on the pan surface will roll into a hole therein and are delivered to a tank having a filling opening. A tank discharge opening is provided for removing the grapes. A conduit provides communication between the hole in the pan and the tank filling opening so that grapes can be conveyed from the pan to the tank therethrough. The apparatus further including a vacuum pump and means positionable above the pan for shaking the wire from which the grapes are hanging. The wire-shaking means is mounted for movement horizontally toward and away from the wire whereby it can be moved into engagement with the wire for shaking the wire when the pan is beneath grapes hanging from the wire so that individual grapes shaken from the clusters fall onto the pan and roll along the upper surface of the pan into the hole in the pan and are then conveyed into the tank.

---

This invention relates to apparatus particularly adapted for harvesting grapes from clusters of grapes hanging from a wire and for conveying the grapes to a tank or compartment.

Among the several objects of the invention may be noted the provision of method and apparatus for harvesting grapes or the like wherein the grapes are separated from the vines and stems during harvesting operations; the provision of method and apparatus for harvesting grapes hanging from vines supported from a wire wherein the grapes are separated from their stems by vibrating or striking the supporting wire; the provision of grape harvesting method and apparatus which protects the harvested grapes from bugs and insects (such as wasps and the so-called sour gnats) which are attracted to grapes at harvest; the provision of method and apparatus for harvesting grapes wherein the grapes are conveyed to a storage tank or compartment without damaging the grapes; and the provision of grape harvesting apparatus which is relatively inexpensive to construct and operate. Other features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated:

FIG. 1 is a diagrammatic plan view of a trellis supporting grape vines;

FIG. 2 is an elevation, partially broken away, of grape harvesting apparatus of the invention;

FIG. 5 is a fragmentary perspective of a modification;

FIG. 8 is a view, partially in section, showing apparatus for simultaneously harvesting grapes from two trellises.

Corresponding reference characters indicate corresponding parts throughout the several views of the drawings.

Figure 3:
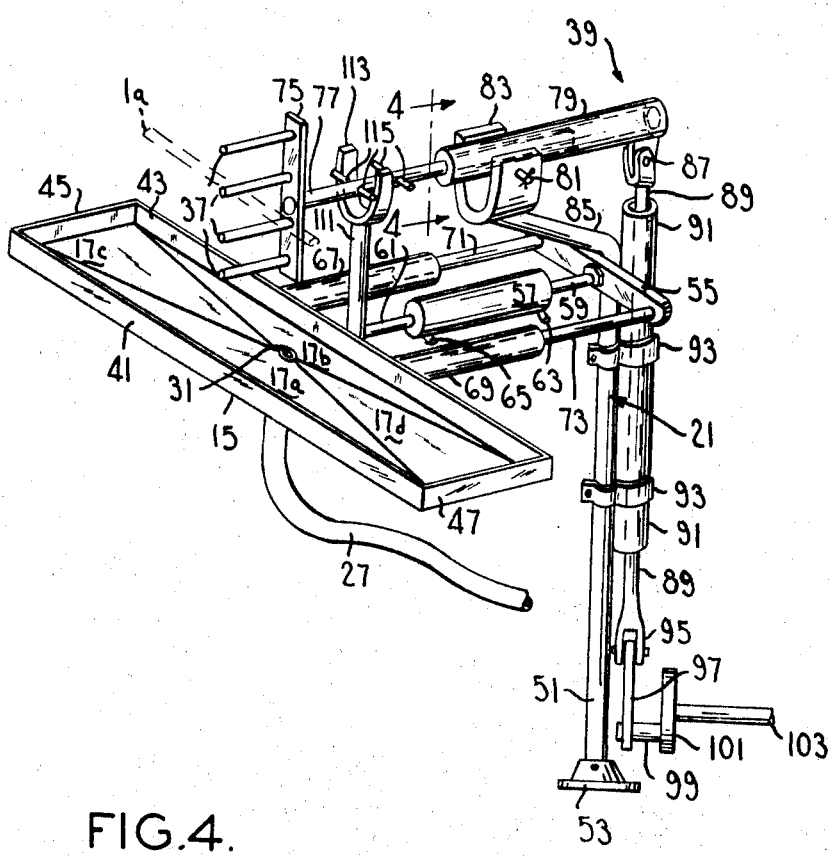
FIG. 3 is a fragmentary perspective of a portion of the FIG. 2 apparatus.

A trellis for supporting grape vines is diagrammatically shown in FIG. 1 to comprise three spaced and generally parallel wires 1a, 1b and 1c which are supported in an elevated position on cross arms 3 carried by posts 5. The center wire 1b is positioned above a plurality of grape vines 7 planted in a row generally in line with posts 5. Posts 5 can be about 16 feet apart with vines 7 being at 8 foot intervals and located about 4 feet from the adjacent post 5. Each vine 7 extends upwardly from the ground around center wire 1b and then to either one of the wires 1a or 1c. As shown in FIG. 1, one of the vines 7 between two posts 5 extends along wire 1a and the other extends along wire 1c. The vines are trained around wires 1a and 1c so that they extend in both directions from a vertical plane perpendicular to all three wires at the place where the vines are planted. In other words, part of the grape-bearing portion of the vine extends to the left from each plant 7 and another part extends to the right from each plant 7. The vines 7 can be trimmed so that the grape-bearing portion of each vine extends about 6–7 feet along wires 1a or 1c. While a portion of each vine 7 is shown extending past the adjacent arm 3, this is new growth and does not normally bear grapes. Thus the portion of vine 7 bearing grapes which are to be harvested in accordance with this invention lie between two adjacent posts 5 and are hanging from the vine portions wrapped around wires 1a and 1c. A cluster of the grapes is generally shown at 9 and individual grapes are designated 11. This arrangement of the trellis and grape vines is typical of installations in the field and does not constitute a portion of the invention. It will be understood that the apparatus and method of the invention are suitable for harvesting grapes or other berries or fruit supported in any suitable manner so that they can be shaken individually from the vine and received by the apparatus.

Figure 4:
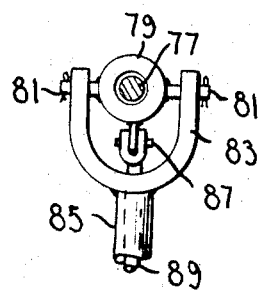
FIG. 4 is a section viewed along line 4—4 of FIG. 3.

Referring now to FIGS. 2–4, apparatus of this invention for harvesting grapes 11 generally comprises a pan 15 which has an upper surface 17 positionable beneath grape clusters 9 for receiving grapes shaken from the clusters. Pan 15 is supported from a tractor 19 by structure generally designated 21. There is a closed receiving tank 23 for holding and transporting grapes harvested by the apparatus of the invention. Tank 23 is carried by a trailer generally designated 25.

A hose or other conduit 27 extends from an inlet or filling opening 29 of the tank to a hole 31 in a center portion of pan 15 so that grapes can be conveyed from pan 15 to tank 23 through the hose. The grapes are moved through hose 27 by creating a pressure differential in the hose between the hole 31 in the pan and the filling opening 29 on tank 23. For this purpose a vacuum pump 33 is provided on trailer 25 and has its suction side communicating with tank 23 through a hose 35. Operation of pump 33 evacuates air from tank 23, thereby creating a partial vacuum in the tank and a pressure drop in hose 27 between hole 31 in the pan and tank 25. The pressure differential between ends of hose 27 is such that grapes entering hose 27 are sucked through the hose into the tank.

Individual grapes 11 are separated from the stems of grape clusters 9 and dropped onto the pan surface 17 by shaking the wires 1a and 1c. The shaking apparatus shown in the drawings includes a plurality of fingers 37 adapted to be moved in a vertical plane by vibrating linkage generally designated 39 which can be driven from the tractor 19. With pan surface 17 beneath grapes 11, one or more of the fingers 37 are placed adjacent the wire 1a or wire 1c and vibrated against the wire with sufficient force to shake the individual grapes 11 loose from the clusters of grapes 9. The grapes fall on surface 17 of pan 15, pass through hole 31 and into the hose 27 where they are conveyed by vacuum to the tank 23 for temporary storage and transportation.

More particularly, the pan 15 comprises two side walls 41 and 43 and two end walls 45 and 47 which extend around the periphery of the surface 17 of the pan. Walls 41-47 project above surface 17 to prevent grapes from rolling off surface 17 of the pan. The surface 17 comprises four generally triangular portions 17a, 17b, 17c and 17d. Each of these triangular portions is inclined downwardly from bases attached to the walls 41, 43, 45 and 47, respectively, to apexes located at the hole 31 in the center of pan 15. With this configuration for surface 17, the grapes will roll into hole 31 from any point on the pan surface. Pan 15 can be about 2 feet wide and 6 to 8 feet long, such normally being sufficient to position it beneath all of the clusters 9 of grapes of any one vine 7 without requiring exact positioning of the pan.

The structure 21 supporting pan 15 on tractor 19 is shown in FIG. 3 to comprise an upright post or support 51 secured at 53 to tractor 19. At the upper end of post 51 there is a bar 55 which supports a hydraulic cylinder or power means 57, the cylinder being attached to the bar by a rod 59. A piston rod 61 projects from cylinder 57 and is connected to a piston (not shown) in cylinder 57. Rod 61 is movable axially relative to the cylinder under control of hydraulic fluid acting against the piston, the fluid being delivered from the tractor hydraulic system to end portions of the cylinder through hydraulic lines 63 and 65. The outer end of rod 61 is attached to pan 15 so that the pan can be moved in a horizontal plane by extension and retraction of rod 61. There are two guide tubes 67, 69 attached to pan 15 on opposite sides of rod 61. Guide tubes 67, 69 receive the ends of a pair of guide rods 71, 73 projecting from the cross bar 55 at opposite sides of cylinder 57. The tubes 67, 69 and rods 71, 73 prevent tilting of pan 15 and support the pan.

The fingers 37 for shaking wires 1a, 1c are generally parallel to each other and are mounted in spaced relation on a vertically positioned elongate plate 75 attached to the outer end of a rod 77. The other end of rod 77 is received by and slides in a guide tube 79 which is movable in a vertical plane about the axis of pivots 81 carried by a U-shape bracket or support 83. Bracket 83 is mounted on an arm or bar 85 carried by post 51. One end of tube 79 is attached by a pin and clevis connection 87 to a connecting rod 89 which reciprocates in a guide tube or pipe 91. Pipe 91 is mounted on post 51 by straps 93.

The lower end of connecting rod 89 is connected at 95 to one end of a crank arm 97. A pin 99 connected to the other end of crank arm 97 is eccentrically mounted on a wheel or disk 101 carried by a shaft 103. Tractor 19 has a power take-off shaft 107 which drives shaft 103 through a belt and pulley arrangement 109. This rotation is converted into reciprocating motion by pin 99, crank arm 97 and the attachment to connecting rod 89 so that the rod 89 reciprocates in tube or pipe 91. This reciprocating movement is transferred to the guide tube 79 to move it and rod 77 up and down in a vertical plane about the axis of the pivots 81 carried by bracket 83. This vibratory motion is imparted to fingers 37 for shaking the wires 1a, 1c to shake individual grapes from the clusters of grapes hanging from the wires. By providing a plurality of fingers 37 the wire can be received between any two adjacent fingers so that it is not necessary to provide exact vertical alignment between the fingers and the wire.

Rod 77 can slide within tube 79 to adjust the position of fingers 37. Movement of fingers 37 is preferably linked to movement of pan 15 so that the pan is always positioned substantially beneath the fingers to prevent accidental loss of grapes by shaking them from a cluster of grapes when the pan is not beneath the grapes. For this purpose a post or support 111 is mounted on pan 15 and attached at its upper end to a U-shape member 113 which straddles rod 77. There are four parallel pins 115 projecting from rod 77. The pins are arranged in pairs axially spaced from each other along the rod on opposite sides of the U-shaped member 113. When pan 15 is moved in a horizontal plane by extension or retraction of rod 61 in cylinder 57, the U-shaped member 113 is also moved horizontally. Member 113 engages pins 115 to extend or retract rod 77 so that the fingers 37 are always positioned immediately above surface 17 of pan 15.

The vacuum pump or motor 33 is coupled to the power take-off shaft 107 of tractor 19 by a linkage designated 117 so that vacuum is being drawn in tank 23 any time grapes are being shaken into pan 15.

Operation of the FIGS. 2–4 apparatus will now be described.

With trailer 25 coupled to tractor 19, the tractor is driven into a grape vineyard between rows of the trellises supporting the grape vines. The tractor moves parallel to the length of wires 1a–1c until pan 15 is adjacent the portion of vines 7 hanging from a wire 1a or a wire 1c. Then the tractor is stopped and pan 15 is moved horizontally to a position immediately beneath the vine 7 on this wire by supplying hydraulic fluid to cylinder 57 to extend rod 61. When the pan 15 is accurately positioned beneath the grapes, two of the fingers 37 will straddle the wire 1a or 1c since the fingers are moved horizontally toward and away from the wire simultaneously with movement of the pan due to the provision of rod 111, U-shaped member 113 and pins 115 which link rod 77 (and thus fingers 37) to movement of the pan. Shaft 103 is then driven from the power take-off shaft 107, thereby rotating wheel 101 and eccentric pin 99 to drive crank arm 97 which reciprocates the connecting rod 89. This reciprocating motion is transferred through the connection 87 to the pipe 79 to pivotally move the pipe in a vertical plane about the axis of the pivots 81. This moves rod 77 and fingers 37 up and down in a vertical plane. The fingers 37 strike the wire 1a or 1c and shake individual grapes 11 from the vines. The grapes drop onto the surface 17 of the pan and roll along the inclined surfaces 17a–17d into hole 31. The stems of grape clusters 9 remain on the vine.

Power take-off shaft 107 also drives the vacuum pump 33 through the linkage 117. Pump 33 exhausts air from the tank through the hose 35 to provide a partial vacuum in tank 23 and a pressure drop between the hole 31 in pan 15 and the filling opening 29 of the tank. Grapes passing through hole 31 are conveyed through hose 27 into the tank by the pressure differential between the ends of the hose. Grapes are moved along the hose quickly and smoothly without damaging the grapes. After the grapes hanging from the portion of the wire between two adjacent posts 5 have been harvested, the piston rod 61 is retracted to pull pan 15 and fingers 37 away from the vines so that the tractor can be driven to a new location along wires 1a, 1c.

Flies, yellow jackets, gnats and the like normally swarm around grapes after they have been picked. However, since tank 23 is closed, there is no opportunity for these insects, etc., to collect around the harvested grapes. The grapes are delivered to tank 23 substantially free of stems, parts of the vines and other foreign matter. The grapes are protected from dirt, water, etc., while they are in the field and being transported to permanent storage or other transportation facilities. In this regard it may be noted that the tank 23 has an outlet port or door 119 through which the grapes can be removed from the tank. If desired, a suitable fitting and hose can be provided at the lower portion of the tank so that the grapes can be conveyed by a vacuum system similar to the one previously described from tank 23 into a large highway transport tank truck for delivery to remove processing facilities.

In the previous description the wires were continuously vibrated for a short period of time by fingers 37 in order to shake the grapes from the clusters. If the wires 1a are sufficiently taut then the fingers 37 can be positioned over (or under) wire 1a and the grapes shaken loose from the cluster by sharply striking the wire 1a or 1c a single time. For example, FIG. 5 shows the lower finger 37 positioned immediately above wire 1a so that it can strike the wire when the fingers are moved up and down in a vertical plane. If wires 1a and 1c are not sufficiently taut on the cross arms 3 for removing the grapes in this manner, then means can be provided for tensioning the wires when they are struck by the fingers 37. As shown in FIG. 5, this is accomplished by hydraulic cylinders 121 mounted on the ends 45 and 47 of pan 15. Each cylinder 121 has a rod 123 projecting from it and there is a bar 125 on the outer end of rods 123. Rods 123 of the cylinders 121 are extended until the bars 125 press upwardly against the wires 1a or 1c to make them taut and then the vibrating mechanism for fingers 37 is operated to strike the wire and thus shake the grapes loose from their clusters so that they fall onto surface 17 of pan 15. Rods 123 can be extended and retracted by the tractor hydraulic system in the manner previously described in connection with rod 61.

Figure 6:
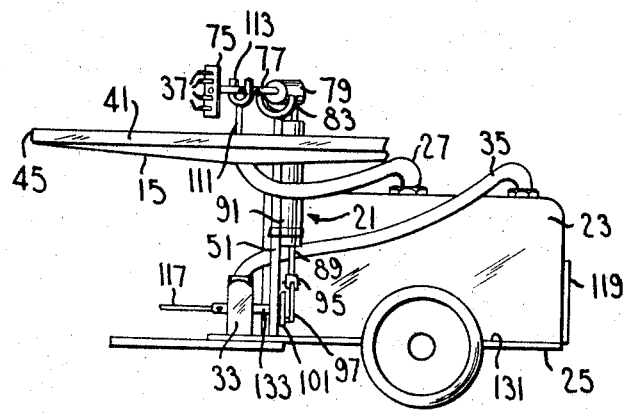
FIG. 6 is a view of a modification showing mounting of all of the apparatus on a trailer.

In FIGS. 2–4 the apparatus 21 supporting the pan 15 and the mechanism for vibrating fingers 37 is mounted on tractor 19. FIG. 6 of the drawings illustrates this structure mounted on a floor or bed 131 of tractor 25 adjacent the front end thereof. The power take-off 117 from tractor 19 still operates vacuum pump 33 and an extension 133 of this power take-off mechanism is connected to the wheel or disk 101 for rotating this disk and vibrating the fingers 37 in the manner previously described. Except for its location, the apparatus shown in FIG. 6 is substantially the same as that illustrated in FIGS. 2–4.

Figure 7:
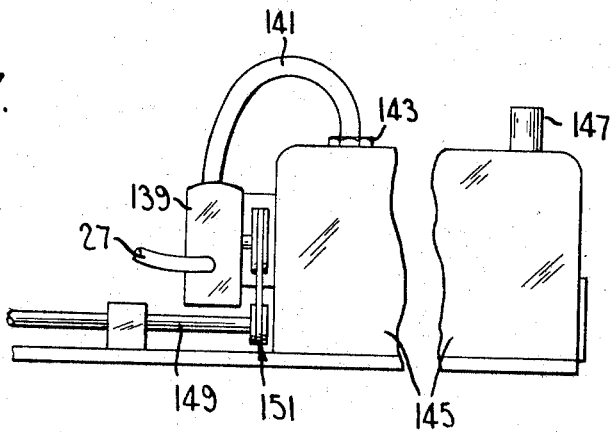
FIG. 7 is a fragmentary view showing a modified means for moving grapes from a pan into a receiving tank.

FIG. 7 shows modified means for moving grapes from the pan into the tank for storage. The grapes are delivered from pan 15 (not shown in FIG. 7) into the hose 27 in the manner previously described. In this embodiment, however, the hose 27 is connected to the inlet or suction side of a vacuum pump 139 and the outlet or pressure side of this pump is connected by hose 141 into an inlet 143 of a storage tank 145. Tank 145 has an air vent or port 147 through which air blown into the tank from hose 141 can be discharged to the atmosphere. The pump 139 is driven by a power take-off connection 149 from the tractor operating through a belt and pulley drive generally designated 151.

The FIG. 7 arrangement is such that upon operation of the power take-off 149 the pump 139 creates a suction in hose 27 to draw grapes through the hose from pan 15 into the pump. Inside the pump they are transferred from the inlet or suction side into the outlet or pressure side of the pump in a conventional manner and are then blown under pressure through hose 141 into the tank 145. Outlet port 147 can be covered with a screen, filter or the like to prevent yellow jackets, gnats or the like from entering the tank but the port should be open sufficiently wide so that air entering the tank from hose 141 can be rapidly discharged from the tank to prevent building up of pressure in the tank which would impede delivery of grapes through hose 141 into the tank.

FIG. 8 of the drawings illustrates apparatus for simultaneously harvesting grapes from wires of two adjacent trellises. The trellis structures shown in FIG. 8 are the same as those described in connection with FIG. 1. The grape vines 7 are shown hanging a substantial distance below wires 1a and 1c which is typical for grape vines in well developed commercial grape orchards.

The FIG. 8 apparatus comprises a closed tank 155 similar to tank 23 previously described. Tank 155 is carried by a trailer 157. A vacuum pump 159 on the trailer is driven by a belt and pulley connection 161 from a power take-off shaft 163 driven from a tractor. Pump 159 removes air from the tank through a hose 165 connected to the suction side of the pump and a fitting 167 on the tank. At each side of tank 155 on trailer 157 there is a large pan 169 having relatively deep side walls 171 and 173 connected by a pan bottom 175. Wall 171 of each pan is connected to suitable supporting structure on trailer 157 so that the bottom 175 of each pan is positioned immediately beneath the grapes 7 hanging from wires 1a and 1c of adjacent trellises in the field. If desired, the walls 171 can be hinged or pivoted to the trailer so that they can be swung upwardly to a position over the trailer when it is not in use.

Pans 169 have relatively short end walls 177 to minimize contact between the pans and the hanging grape vines. Each pan bottom tapers to a centrally located hole 179 in the manner previously described for pan 15. Flexible hoses 181 are connected at one end to pans 169 to receive grapes passing through holes 179 and are connected at the other end to inlet fittings 183 of the trailer 155. Thus grapes are delivered from the pans into tank 155 in the manner previously described. There are upright posts or standards 185 at the sides of the trailer. Arms 187 are swiveled to the top of these posts or standards so that they can be moved arcuately in a horizontal plane. Arms 187 can be moved manually or by powered apparatus (not shown) linked to the arms. Mounted at the outer end of arms 187 are hydraulic cylinders 189 controlled by hydraulic fluid under pressure supplied to the cylinders through fluid lines 191. These fluid lines are connected to a hydraulic pump 193 mounted on trailer 157 and driven from power take-off shaft 163 by a belt and pulley arrangement designated 195. The hydraulic power means 189 in operation reciprocates a mounting bar 197 to which a plurality of fingers 199 are attached. The bar 197 and fingers 199 are similar to those previously described in connection with bar 75 and fingers 37.

In operation, the trailer 157 of the FIG. 8 apparatus is pulled between two rows of grape vines with the pans 169 beneath the hanging vines 7. The arms 187 supporting the power means 189 are, at this time, swung in a horizontal plane from their FIG. 8 position to prevent the fingers 199 from engaging vine 7 until the apparatus is properly positioned for shaking the grapes from the vine. The trailer is stopped between the trellises, and arms 187 are swung horizontally to position the fingers 199 so that one of the fingers is above or below the wires 1a and 1c at the sides of the trailer. Then the operator initiates movement of the fluid through lines 191 to the hydraulic cylinders so that the fingers 199 strike the wires to shake the individual grapes from the hanging vines. This shaking operation can be a sharp striking blow such as is provided by the apparatus of FIG. 5 or it can be a continuously vibrating movement as described in connection with FIGS. 1–4. It will be understood that the power means 189 can be an electric motor, suitable vibrating apparatus such as that previously described, or other means for imparting the desired motion to fingers 199.

The individual grapes shaken from vines 7 drop into the pan between side walls 171 and 173, roll along the bottom 175 of the pan and into hole 179. Then they are conveyed by vacuum in hose 181 into the tank where they drop into the tank. After substantially all the grapes have been shaken loose from the vines 7 at a particular location the arms 187 are again swung to a position where they will not interfere with the grape vines 7, and the trailer 157 is advanced between the trellises to the next position for harvesting grapes.

In the various embodiments of this invention the individual grapes are separated from the stems and vines by shaking the vines and the grapes are conveyed to the tanks without damaging the crop or exposing it to insects or bugs, dirt, etc. The apparatus is relatively inexpensive to construct and can be operated by one or two workers, thereby reducing the costs for harvesting grapes. The tanks for the grapes may be refrigerated if they are to hold grapes for any extended period of time.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for harvesting grapes hanging in clusters from vines supported on generally horizontal wires, the apparatus comprising an open topped pan having an upper surface for collecting grapes falling from the grape clusters, the pan having a hole through it and said upper surface being tapered downwardly toward the pan hole whereby grapes falling on the pan surface will roll into the hole, a tank having a filling opening through which grapes can be delivered to the tank and a discharge opening for removing grapes from the tank, a conduit communicating with the hole in the pan and the tank filling opening so that grapes can be conveyed from the pan to the tank through the conduit, a vacuum pump, means positionable above the pan for shaking the wire from which the grapes are hanging, means mounting the wire-shaking means for movement horizontally toward and away from the wire whereby the wire-shaking means can be moved into engagement with the wire for shaking the wire when the pan is beneath grapes hanging from the wire so that individual grapes shaken from the clusters fall onto the pan and roll along the upper surface of the pan into the hole in the pan and are then conveyed into the tank.

2. Apparatus for harvesting grapes as set forth in claim 1 further comprising means mounting the pan for movement horizontally to and from a position beneath the clusters of grapes, power means for moving the pan in and out of said position, and means linking the pan-mounting means to the means mounting the wire-shaking means for joint horizontal movement of the pan and the shaking means whereby the pan is positioned beneath the grapes when the shaking means is engageable with the wire.

3. Apparatus for harvesting grapes as set forth in claim 1 wherein the conduit is a flexible hose, the hose is connected to the pan in communication with the hole therethrough and to the filling opening of the tank, and the vacuum pump has a suction side communicating with the tank whereby operation of the pump creates a partial vacuum in the tank and a pressure differential between the pan hole and the tank so that grapes are moved through the hose by a vacuum.

4. Apparatus for harvesting grapes as set forth in claim 1 wherein said tank is vented to the atmosphere, the conduit is a flexible hose, the hose is in communication with the pan hole and with a suction side of the vacuum pump, and there is a second flexible hose communicating with the pressure side of the vacuum pump and with the tank filling opening whereby grapes are moved through the first hose to the vacuum pump by a suction and then moved from the vacuum pump into the tank through the second hose by a pressure.

5. Apparatus for harvesting grapes as set forth in claim 1 wherein the tank is carried by a trailer, and the pan and the shaking means are mounted on a vehicle for pulling the trailer.

6. Apparatus for harvesting grapes as set forth in claim 1 wherein the tank is mounted on a trailer, and the pan and shaking means are supported from the trailer.

7. Apparatus for harvesting grapes as set forth in claim 1 further comprising two hydraulic cylinders mounted at opposite ends of said pan, each of said cylinders having a rod adapted for extension and retraction from a cylinder in a vertical direction, and means on the outer end portion of said rods adapted to engage a wire supporting grape clusters or the like for holding said wire taut while it is struck by said shaking means.

8. Apparatus for harvesting grapes as set forth in claim 1 further comprising a second pan positionable beneath grape clusters, and additional shaking means positionable above the second pan, and the conveyor means further comprises a second conduit connected to the second pan and to the tank for conveying grapes from the second pan to the tank.

References Cited

UNITED STATES PATENTS

| 1,185,110 | 5/1916 | LeBaron | 56—330 X |
| 2,789,409 | 4/1957 | Crump | 56—330 |
| 3,184,908 | 5/1965 | Rust | 56—330 |
| 3,225,530 | 12/1965 | Weygandt et al. | 56—330 |
| 3,187,493 | 6/1965 | Harrett | 56—330 |
| 3,303,638 | 2/1967 | Koehn | 56—330 |

HUGH R. CHAMBLEE, *Primary Examiner.*